United States Patent
Goodman et al.

(10) Patent No.: US 7,660,943 B2
(45) Date of Patent: Feb. 9, 2010

(54) DATA STORAGE DRIVE FOR AUTOMATED DATA STORAGE LIBRARY

(75) Inventors: Brian Gerard Goodman, Tucson, AZ (US); Paul Merrill Greco, Tucson, AZ (US); Glen Alan Jaquette, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 11/356,771

(22) Filed: Feb. 17, 2006

(65) Prior Publication Data
US 2007/0198773 A1    Aug. 23, 2007

(51) Int. Cl.
*G06F 12/00*    (2006.01)

(52) U.S. Cl. .................. 711/112; 711/114; 711/161; 711/162

(58) Field of Classification Search .................. None
See application file for complete search history.

(56) References Cited

U.S. PATENT DOCUMENTS

| | | | |
|---|---|---|---|
| 6,356,803 B1 * | 3/2002 | Goodman et al. ........... 700/218 |
| 6,434,090 B1 | 8/2002 | Basham et al. |
| 6,553,489 B1 | 4/2003 | Osler et al. |
| 6,795,889 B2 | 9/2004 | Berg et al. |
| 2003/0103500 A1 | 6/2003 | Menon et al. |
| 2003/0140210 A1 | 7/2003 | Testardi |
| 2004/0064596 A1 * | 4/2004 | Erickson et al. ................. 710/5 |
| 2004/0107320 A1 | 6/2004 | Gallo et al. |
| 2004/0153206 A1 * | 8/2004 | Goodman et al. ........... 700/214 |
| 2005/0080992 A1 * | 4/2005 | Massey et al. ............... 711/114 |
| 2005/0149641 A1 | 7/2005 | Workman et al. |
| 2006/0034192 A1 * | 2/2006 | Hurley et al. ................. 370/254 |

OTHER PUBLICATIONS

Chinese Office Action dated Aug. 7, 2009 for Application No. 200710001622.6, filed Jan. 9, 2007.

* cited by examiner

*Primary Examiner*—Than Nguyen
(74) *Attorney, Agent, or Firm*—William K. Konrad; Konrad Raynes & Victor LLP (57) ABSTRACT

A method, system, and a device have a data storage drive for an automated data storage library in which a data storage drive may have in one embodiment, both a host-drive interface port and a host-library interface port. In one aspect, drive commands from a host system are conducted primarily through the host-drive interface port and a host-drive interface path to a drive controller of the data storage drive. In addition, library commands from the host system to a library controller may be conducted primarily through the host-library interface port and a host-library interface path to a library communication port of the data storage drive. In one embodiment, the drive commands from a host system are conducted primarily through the host-drive interface port and the host-drive interface path to a drive controller of the data storage drive. In addition, the library commands from a host system are conducted primarily through the host-library interface port and the host-library interface path to the library communication port of the data storage drive. Other embodiments are described and claimed.

23 Claims, 7 Drawing Sheets

DATA STORAGE DRIVE FOR AUTOMATED DATA STORAGE LIBRARY

BACKGROUND

Automated data storage libraries are known for providing cost effective storage and retrieval of large quantities of data. The data in automated data storage libraries is stored on data storage media that are, in turn, stored in storage bins having storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage bins and data storage drives is typically accomplished by one or more robot accessors (hereinafter termed "accessors"). Such accessors have grippers for physically retrieving the selected data storage media from the storage bins within the automated data storage library and transport such media to the data storage drives by moving in the X and/or Y directions.

SUMMARY OF THE DESCRIPTION

A method, system and a device have a data storage drive for an automated data storage library in which a data storage drive may have in one embodiment, both a host-drive interface port and a host-library interface port. In one aspect, drive commands from a host system are conducted primarily through the host-drive interface port and a host-drive interface path to a drive controller of the data storage drive. In addition, library commands from the host system to a library controller may be conducted primarily through the host-library interface port and a host-library interface path to a library communication port of the data storage drive. In one embodiment, the drive commands from a host system are conducted primarily through the host-drive interface port and the host-drive interface path to a drive controller of the data storage drive. In addition, the library commands from a host system are conducted primarily through the host-library interface port and the host-library interface path to the library communication port of the data storage drive. Other embodiments are described and claimed.

DETAILED DESCRIPTION OF THE DRAWINGS

This description is provided with reference to the Figures, in which like numerals represent the same or similar elements. While the description provides certain examples, it will be appreciated by those skilled in the art that the description provided herein is intended to cover alternatives, modifications, and equivalents as may be included within the spirit and scope of this description such as those defined by the appended claims.

One example of the present description is embodied in an automated magnetic tape library storage system for use in a data processing environment. Although this example describes the use of magnetic tape cartridges in an embodiment, one skilled in the art will recognize that the description provided herein applies also to optical disk cartridges or other removable storage media and the use of either different types of cartridges or cartridges of the same type having different characteristics. Furthermore the description of a tape drive is not meant to limit this description to magnetic tape drives as the description may be applied to any removable media drive and cartridge. Still further, an automated magnetic tape storage system is not meant to limit this description to magnetic tape data processing applications as the description may be applied to any media storage and cartridge handling systems in general.

Figure 1:
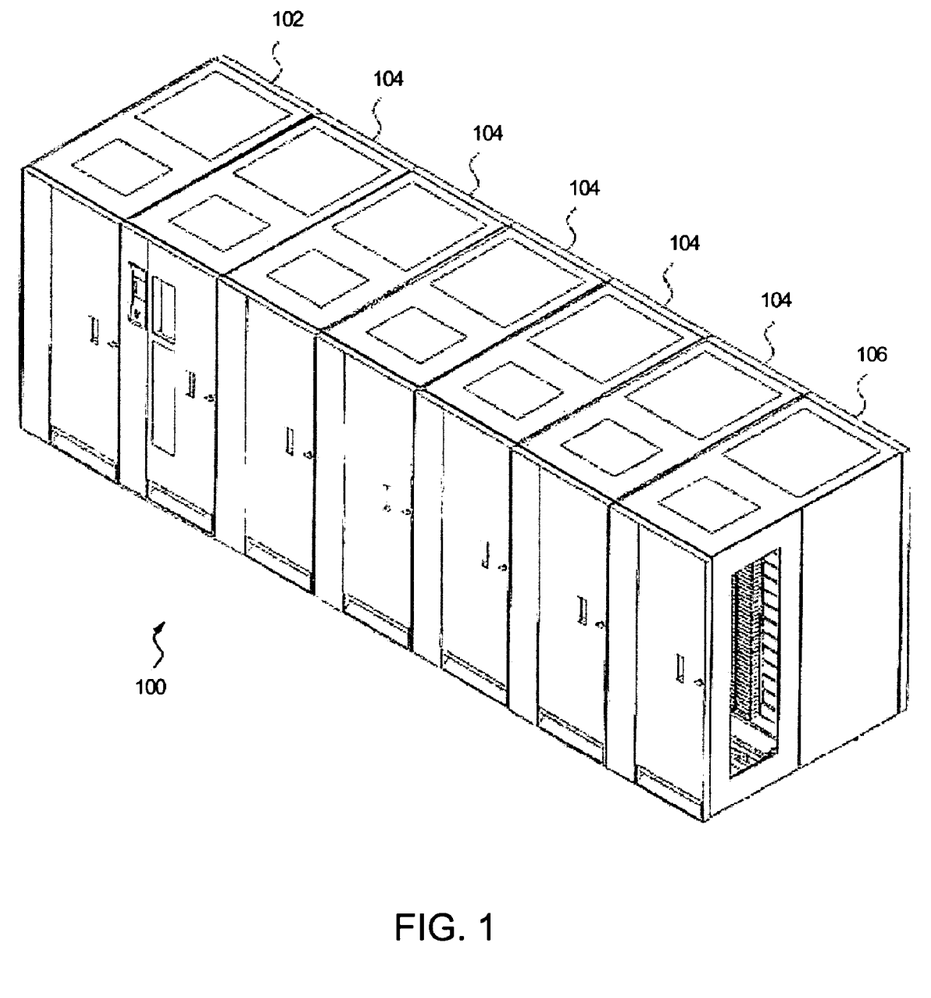
FIG. 1 is an isometric view of an automated data storage library adaptable to implement an embodiment of the present description, with the view specifically depicting a library having a left hand service bay, multiple storage frames and a right hand service bay.
Figure 2:
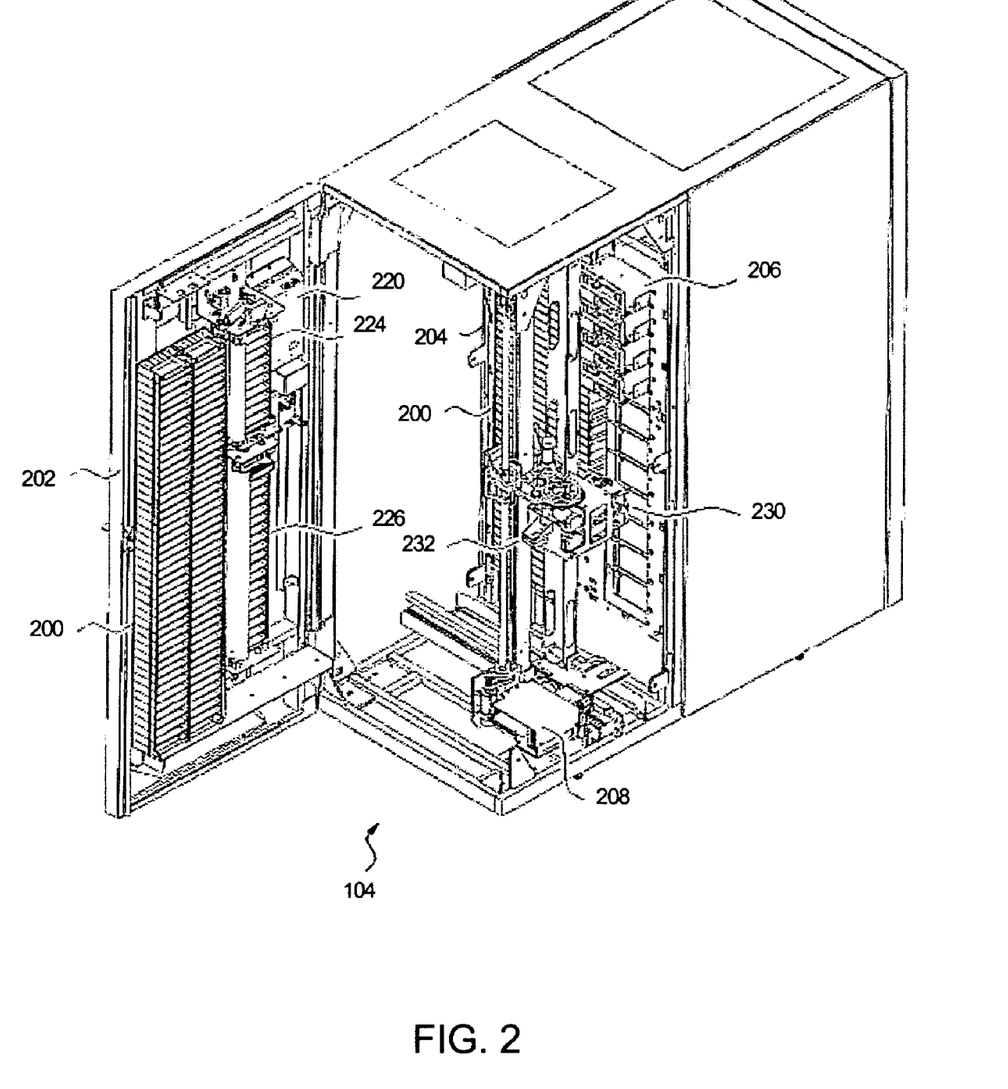
FIG. 2 is an isometric view of an exemplary basic configuration of an internal component of the library of FIG. 1.

Turning now to the Figures, FIGS. 1 and 2 illustrate an automated data storage library 100 which stores and retrieves data storage cartridges containing data storage media. It is noted that references to "data storage media" herein refer to data storage cartridges, and for purposes herein the two terms are used synonymously. An example of an automated data storage library as depicted in FIGS. 1 and 2 in which aspects of the present description may be applied, is the IBM 3584 UltraScalable Tape Library. The library of FIG. 1 comprises a left hand service bay 102, one or more storage frames 104, and right hand service bay 106. As will be discussed, a frame may comprise an expansion component of the library. Frames may be added or removed to expand or reduce the size and/or functionality of the library. Frames may comprise additional storage bins, drives, import/export stations, accessors, operator panels, etc.

FIG. 2 shows an example of a storage frame 104, which is the base frame of the library 100 and is contemplated to be the minimum configuration of the library. In this minimum configuration, there is only a single accessor (i.e., there are no redundant accessors) and there is no service bay. The library 100 is arranged for accessing data storage media in response to library commands from at least one external host system (300, FIG. 3), and comprises a plurality of storage bins 200, on a front wall 202 and rear wall 204 for storing data storage cartridges that contain data storage media. At least one data storage drive 206 reads and/or writes data with respect to the data storage media in response to drive commands from a host such as the host 300. A first accessor 208 transports the data storage media between the plurality of storage bins 200 and the data storage drive(s) 206 in response to library commands from a host such as the host 300. The data storage drives 206 may be optical disk drives or magnetic tape drives, or other types of data storage drives as are used to read and/or write data with respect to the data storage media.

Figure 3:
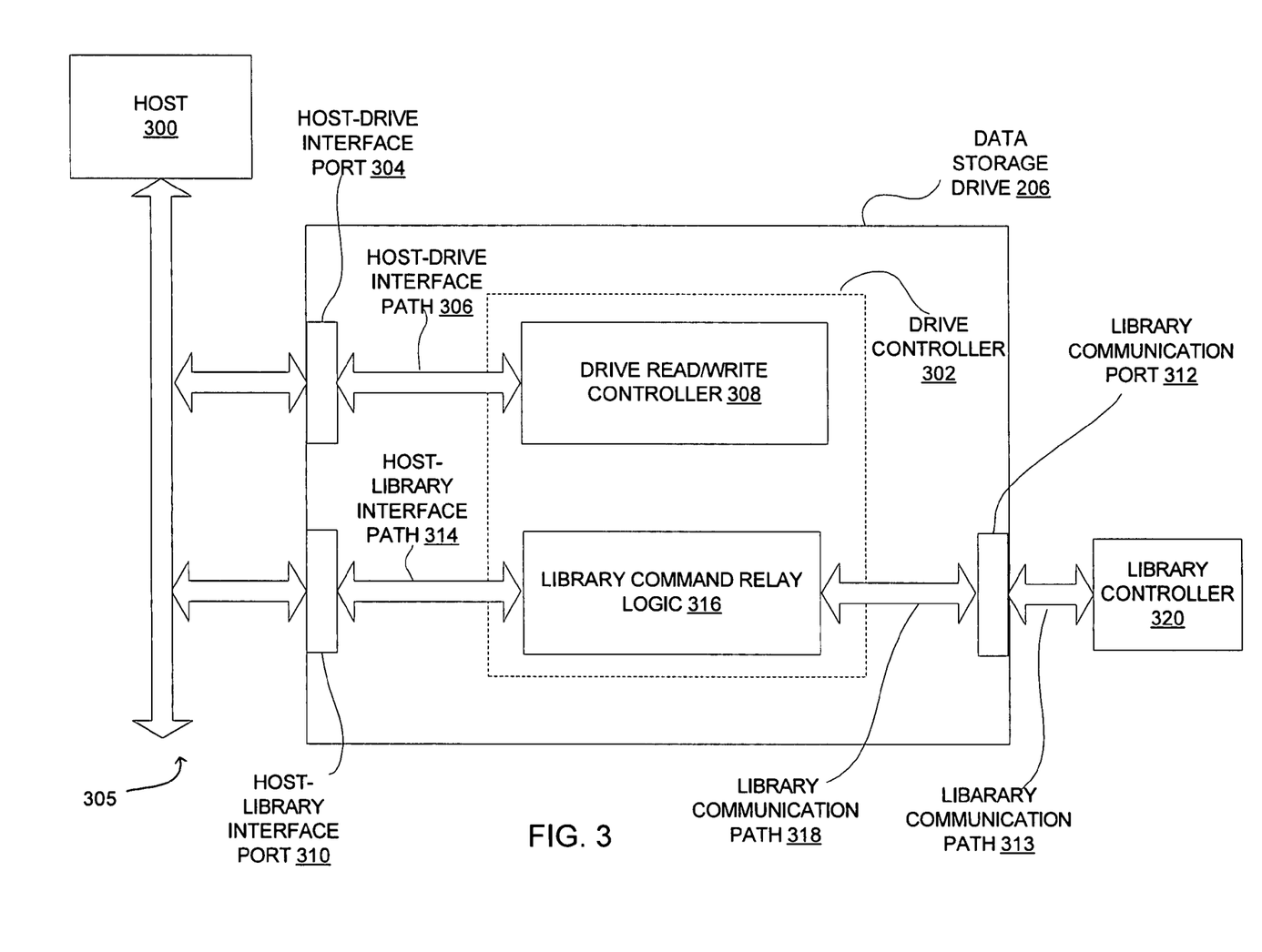
FIG. 3 is a schematic block diagram of one example of a data storage drive for the library of FIG. 1.

As schematically represented in FIG. 3, a data storage drive 206 may have a drive controller 302, a first host interface port (host-drive interface port) 304, and a host-drive path 306 coupling the first host interface port 304 to the drive controller 302. The first host interface port 304 is adapted to be coupled by a network 305 to a host 300. A drive read/write controller 308 of the drive controller 302 is responsive to drive commands from the host 300 to selectively read drive data from and/or write drive data to a media item removably received in the data storage drive 206.

As explained in greater detail below, and in accordance with one aspect of the present description, the data storage drive 206 may further have a second host interface port (host-library interface port) 310 which may be coupled to the host 300 by the network 305, and a library communication port 312 adapted to be coupled to the library controller 320 by a library communication path 313. A host-library interface path 314 adapted to carry library commands from the host 300, couples the second host interface port 310 to the library communication port 312 via a library command relay logic 316 of the drive controller 302 and a library communication path 318 coupling the library command relay logic 316 to the library communication port 312. The library command relay logic 316 is adapted to relay library commands from the second host interface port 310 to the communication port 312 of the storage drive 206. The library command relay logic 316 may pass all commands to the library controller 320. Alternatively, the library command relay logic 316 may respond to some commands while passing other commands through. For example, the library command relay logic may maintain ready/not-ready state information about the library controller. If the library state is "not-ready", then the library command relay logic may report this status without actually passing any commands to the library controller 320. In another example, the library command relay logic may maintain inventory state information about the library. A SCSI Read Element Status command may result in the library command relay logic actually processing the command, rather than passing it on to the library controller 320. Herein, relaying library commands may refer to passing some or all library commands to the library communication port 312. The passed commands may be modified or unchanged. The library command relay logic 316 may comprise discrete logic, programmable logic, custom logic, one or more processors, software or firmware modules, etc. In addition, the library command relay logic 316 and the drive read/write controller 308 may comprise a single processor or controller that supports both functions. The library controller 320 of a library 100 is responsive to the library commands from the host 300 to transport data storage media between the library storage bins 200 (FIG. 2) and a data storage drive such as the drive 206. Although the illustrated embodiment depicts the data storage drive 206 as having two host interface ports 304, 310, it is appreciated that in other embodiments, a data storage drive in accordance with the present description may have additional host interface ports.

The first and second host interface ports 304, 310 may comprise a connector, plug, adapter, cable, wire, circuit, etc., for interfacing the storage drive 206 to the host 300. In addition, the first and second host interface ports 304, 310 may comprise electronics and/or firmware for providing a communication protocol between the storage drive 206 and the host 300. The host paths 306, 314 may comprise a cable, circuit, connection, wire, electronics, firmware, etc., for interfacing the host ports 304, 310 to the storage drive 206.

In the illustrated embodiment, the first and second host interface ports 304, 310 of the data storage drive 206 may be physically separate and independently operated from each other. In one example, the host-drive interface port 304 may have a first physical device identification number and the host-library interface port 310 may have a second physical device identification number different from the first physical device identification number for the port 304. The device identification number may comprise a SCSI ID, a Fibre Channel ID, etc. In another example, the host-drive interface port 304 and the host-library interface port 310 may have the same physical device identification number wherein the host-drive interface port 304 has a first logical unit number (LUN) and the host-library interface port 310 has a second logical unit number different from the first logical unit number of the port 304. In this manner, the ports 304, 310 may be separately and independently addressed by a host such as the host 300.

In another aspect, the interface paths 306, 314 of the data storage drive 206 may be physically separate and independently operated from each other. Still further, drive commands from the host 300 may be conducted primarily through the first host-drive interface port 304 and the host-drive interface path 306 to the drive controller 302 of the data storage drive 206. In addition, library commands from the host 300 to the library controller 320 may be conducted primarily through the second host-library interface port 310 and the host-library interface path 314 to the library communication port 312 of the data storage drive 206. In this manner, a communication path between the host 300 and the drive controller 302 for communicating drive commands and drive data, may be at least partially separated from a communication path between the host 300 and a library accessor 208 for communicating library commands. Thus, should a failure occur, for example, in the host-drive interface port 304 or the host drive interface path 306, the host 300 can nonetheless continue to provide library commands to the library controller 320 via the host-library interface port 310 and the host-library interface path 314 to transport media between the storage bins 200 and the data storage drives 206 of the library 100.

The library communication port 312 may comprise a connector, plug, adapter, cable, wire etc., for interfacing the storage drive 206 to the library controller 320. In addition, the library communication port 312 may comprise interface electronics and/or firmware for providing a communication protocol between the storage drive 206 and the library controller 320. The library communication paths 313, 318 may comprise a cable, wire, circuit, connection, electronics, firmware, etc.

In another aspect, there may be more than one drive controller 302 such that first host interface 304 and host-drive interface path 306 are associated with one controller, a drive command controller (not shown), while second host interface 310 and host-library interface path 314 are associated with another controller, a library command controller (not shown). In some applications, it may be appropriate to provide at least some isolation between the first and second host interfaces including whole or partial functional independence between a drive command controller and a library command controller of the drive 206.

It is appreciated that other features of at least partially separate communication paths for drive commands and library commands may be utilized, depending upon the particular application. For example, a drive controller 302 may have separate blocks of programming code for drive and library communications. Thus, one block or set of blocks of programming code may be directed to receiving drive commands and handling drive read and/or drive write data whereas another, separate block or set of blocks of programming code may be directed to receiving library commands and handling some of the library commands and/or passing some or all of the library commands to the library controller 320.

In another example, the drive controller 302 may have independent interrupt handlers for drive and library communications. Thus, one or more interrupt handlers may be directed to handling interrupts arising in connection with the processing of drive commands for drive read and/or drive write data whereas one or more separate and independent interrupt handlers may be directed to handling interrupts arising in connection with the processing of library commands for handling some of the library commands and/or passing some or all of the library commands to the library controller 320. Again, it is appreciated that other features of at least partially separate communication paths for drive commands and library commands may be utilized, in addition thereto or instead of those described herein, depending upon the particular application.

In another aspect, one or more of the host interface ports 304, 310 may be configurable to selectively handle either primarily drive commands and read/write data, or primarily library commands, depending upon the selected configurations. In the illustrated embodiment, the host interface port 304 is depicted in FIG. 3 as being configured in a first configuration wherein the drive commands from the host 300 are conducted primarily through the configurable host interface port 304 and the host interface path 306 to the drive controller 302 of the data storage drive 206. In addition, the read/write data between the host 300 and the media of the data storage drive 206 are conducted primarily through the configurable host interface port 304 and the host interface path 306. In another example, the host interface port 304 may be selectively configured to an alternate configuration in which the library commands from the host 300 to the library controller 320 are conducted primarily through the configurable host interface port 304 and the host interface path 306 to the library communication port 312 of the data storage drive 206.

In a similar manner, the host interface port 310 is depicted in FIG. 3 as being configured in a first configuration wherein the library commands from the host 300 to the library controller 320 are conducted primarily through the configurable host interface port 310 and the host interface path 314 to the library communication port 312 of the data storage drive 206. In another example, the host interface port 310 may be selectively configured to an alternate configuration in which the drive commands from the host are conducted primarily through the configurable host interface port 310 and the host interface path 314 to the drive controller 302 of the data storage drive 206. In addition, the read/write data between the host 300 and the media of the data storage drive 206 are conducted primarily through the configurable host interface port 310 and the host interface path 314.

Thus, in one embodiment, the host interface ports 304, 310 may be independently configured such that one host interface port handles primarily drive commands and one host interface port handles primarily library commands. In another example, both host interface ports 304, 310 may be independently configured as host-drive interface ports such that both host interface ports 304, 310 handle primarily drive commands and drive read/write data between the host and the data storage drive. In one embodiment, one host interface port can function as a host-drive interface backup port for the other host-drive interface port. Similarly, in another example, both host interface ports 304, 310 may be independently configured as host-library interface ports such that both host interface ports 304, 310 handle primarily library commands from the host 300 to the library accessor 208. In one embodiment, one host interface port can function as a host-library interface backup port for the other host-library interface port. In this manner, the ports 304, 310 of a particular storage drive 206 may be configured as appropriate for the particular application. In the case where more than one host interface port is configured as a host-library interface port 310, there may be more than one library communication port 312 such that each host-library interface port 310 has an associated library communication port 312. Alternatively, the multiple host-library interface ports 310 may be multiplexed or coupled to a single library communication port 312 through electronic circuits and/or firmware.

It is appreciated that in other embodiments, the ports 304, 310 may not be configurable but may be dedicated to handle a selected one of the drive commands and the library commands, depending upon the particular application. In addition, embodiments are described herein in which one host interface port such as host-drive interface port 304 is adapted to handle primarily drive commands and drive read/write data. It is appreciated that in some applications, a host-drive interface port such as the port 304 may handle no library commands. Conversely, embodiments are described herein in which one host interface port such as host-library interface port 310 is adapted to handle primarily library commands. It is appreciated that in some applications, a host-library interface port such as the port 310 may handle no drive commands and no drive read/write data, depending upon the particular application.

While FIG. 3 and the accompanying description only show a single host 300, it should be noted that more than one host computer may be coupled to port 304 and/or port 310.

Referring further to FIG. 2, in the illustrated embodiment, the storage frame 104 may optionally comprise an operator panel 220 or other user interface, such as a web-based interface, which allows a user to interact with the library. The storage frame 104 may optionally comprise an upper I/O station 224 and/or a lower I/O station 226, which allows data storage media to be inserted into the library and/or removed from the library without disrupting library operation. The library 100 may comprise one or more storage frames 104, each having storage bins 200 accessible by first accessor 208.

As described above, the storage frames 104 may be configured with different components depending upon the intended function. One configuration of storage frame 104 may comprise storage bins 200, data storage drive(s) 206, and other optional components to store and retrieve data from the data storage cartridges. The first accessor 208 comprises a gripper assembly 230 for gripping one or more data storage media and may include a bar code scanner 232 or other reading system, such as a cartridge memory reader or similar system, mounted on the gripper 230, to "read" identifying information about the data storage media.

Figure 4:
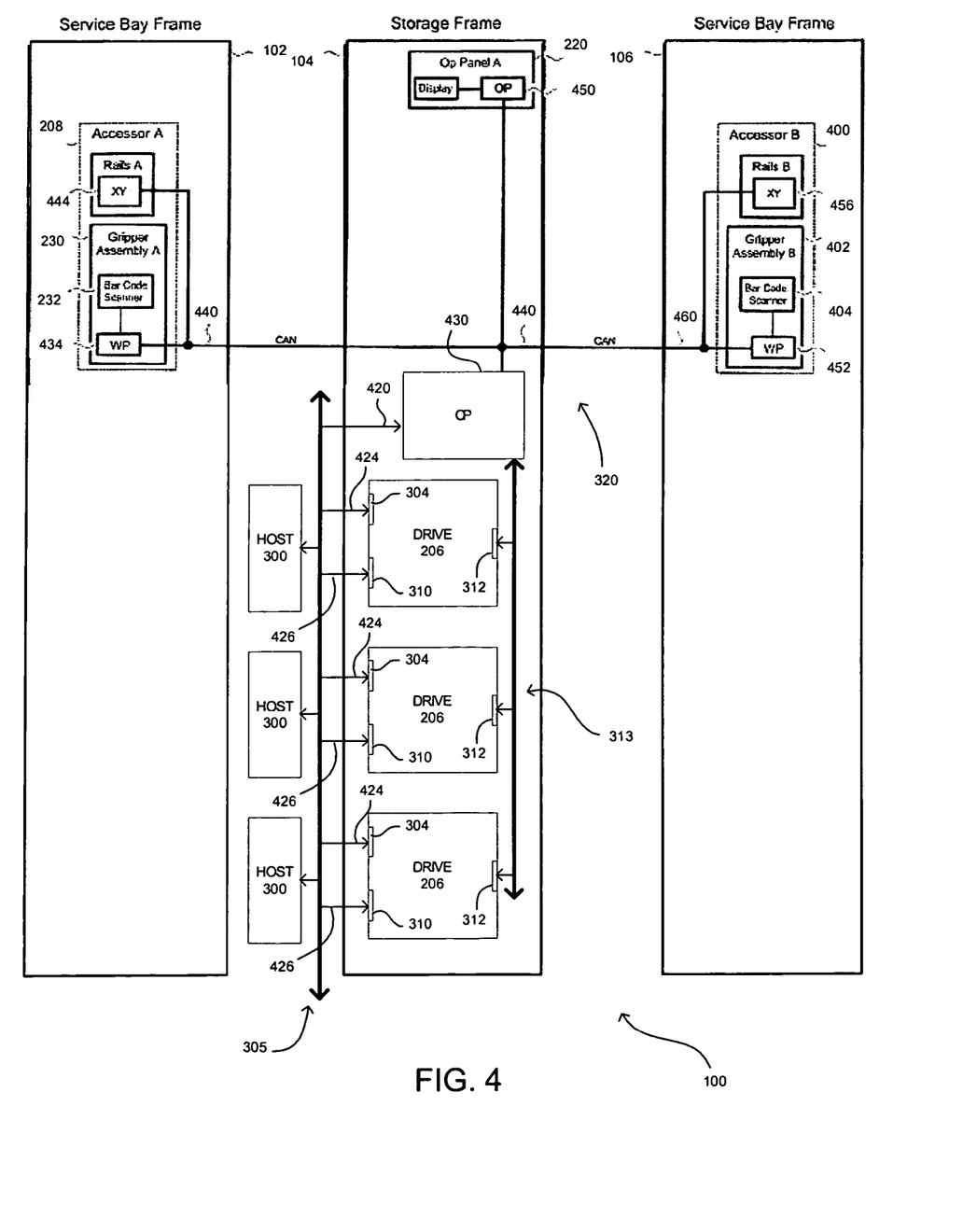
FIG. 4 is a schematic block diagram of one example of a distributed system of modules with a plurality of processor nodes, for the library of FIG. 1.

FIG. 4 illustrates an embodiment of an automated data storage library 100 of FIGS. 1 and 2, which employs a distributed system of modules with a plurality of processor nodes. An example of an automated data storage library which may implement the distributed system depicted in the block diagram of FIG. 4 is the IBM 3584 UltraScalable Tape Library. For a fuller general understanding of a distributed control system incorporated in an automated data storage library, refer to U.S. Pat. No. 6,356,803, which is entitled "Automated Data Storage Library Distributed Control System," which is incorporated herein for reference.

While the automated data storage library 100 has been described as employing a distributed control system, embodiments may be implemented in automated data storage libraries regardless of control configuration, such as, but not limited to, an automated data storage library having one or more library controllers that are not distributed, as that term is defined in U.S. Pat. No. 6,356,803. The library 100 of FIG. 4 comprises one or more storage frames 104, a left hand service bay 102 and a right hand service bay 106. The left hand service bay 102 is shown with a first accessor 208. As discussed above, the first accessor 208 comprises a gripper assembly 230 and may include a reading system 232 to "read" identifying information about the data storage media. The right hand service bay 106 is shown with a second accessor 400. The second accessor 400 comprises a gripper assembly 402 and may include a reading system 404 to "read" identifying information about the data storage media. In the event of a failure or other unavailability of the first accessor 208, or its gripper 230, etc., the second accessor 400 may perform some or all of the functions of the first accessor 208. The two accessors 208, 400 may share one or more mechanical paths or they may comprise completely independent mechanical paths. In one example, the accessors 208, 400 may have a common horizontal rail with independent vertical rails. The first accessor 208 and the second accessor 400 are described as first and second for descriptive purposes only and this description is not meant to limit either accessor to an association with either the left hand service bay 102, or the right hand service bay 106.

In the exemplary library, first accessor 208 and second accessor 400 move their grippers in at least two directions, called the horizontal "X" direction and vertical "Y" direction, to retrieve and grip, or to deliver and release the data storage media at the storage bins 200 and to load and unload the data storage media at the data storage drives 206.

The exemplary library 100 receives commands from one or more host systems 300. The host systems, such as host servers, may communicate with the library directly, e.g., on path 420, through one or more control ports (not shown), or through one or more data storage drives 206. The host systems 300 may communicate through the data storage drives 206 on paths 424, providing drive commands to host-drive interface ports 304 to access particular data storage. The host systems 300 may also communicate through the data storage drives 206 on paths 426, providing library commands to host-library interface ports 310 to move the media, for example, between the storage bins 200 (FIG. 2) and the data storage drives 206. The library commands are typically logical commands identifying the media and/or logical locations for accessing the media. The terms "commands" and "work requests" are used interchangeably herein to refer to such communications from the host system 300 to the library 100 as are intended to result in accessing particular data storage media within the library 100. There may be more than one host system 300 coupled to the library 100 and drives 206, as shown in FIG. 4. Each host system may be coupled to one or more drives 206, the library 100 or other host systems 300 in any suitable fashion. For example, each host system 300 may have its own network 305 and/or paths 424 and/or path 426, or they may share one or more networks 305 and/or paths 424 and/or paths 426.

The exemplary library is controlled by a controller 320 receiving the logical commands from hosts, determining the required actions, and converting the actions to physical movements of first accessor 208 and/or second accessor 400. In the exemplary library, the library controller 320 is a distributed control system comprising a plurality of processor nodes, each having one or more processors. In one example of a distributed control system of the library controller 320, a communication processor node 430, may be located in a storage frame 104. The communication processor node provides a communication link for receiving the host library commands, either through the drives 206, or via at least one external interface, e.g., coupled to line 420.

In the illustrated embodiment, the communication link of the communication processor node 430 includes the library communication path 313 comprising one or more lines, connections, or interfaces for communicating with the data storage drives 206. The communication processor node 430 may be located in the frame 104, close to the data storage drives 206. Additionally, in an example of a distributed processor system, one or more additional work processor nodes are provided, which may comprise, e.g., a work processor node 434 that may be located at first accessor 208 which may be coupled to the communication processor node 430 via a network 440. Each work processor node may respond to received library commands that are broadcast to the work processor nodes from any communication processor node, and the work processor nodes may also direct the operation of the accessors, providing move commands as a function of the received library commands. An XY processor node 444 may be provided and may be located at an XY system of first accessor 208. The XY processor node 444 is coupled to the network 440, and is responsive to the move commands, operating the XY system to position the gripper 230.

Also, an operator panel processor node 450 may be provided at the optional operator panel 220 for providing an interface for communicating between the operator panel and the communication processor node 430, the work processor nodes 434, 452, and the XY processor nodes 444, 456.

A network, for example comprising a common bus 440, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 430 is coupled to each of the data storage drives 206 of a storage frame 104, via lines 313, communicating with the drives and with host systems 300. Alternatively, the host systems may be directly coupled to the communication processor node 430, at input 420 for example, or to control port devices (not shown) which connect the library to the host system(s) with a library interface similar to the host-library interface. As is known to those of skill in the art, various communication arrangements may be employed for communication with the hosts and with the data storage drives. In the example of FIG. 4, host connections 420 and 424 are SCSI busses. However, it is appreciated that other bus or network architectures may be used. Additional examples include Ethernet or a Fibre Channel bus which is a high speed serial data interface, typically allowing transmission over greater distances than the SCSI bus systems.

The data storage drives 206 may be in close proximity to the communication processor node 430, and may employ a short distance communication scheme, such as SCSI, or a serial connection, such as RS-422. The data storage drives 206 are thus individually coupled to the communication processor node 430 by means of lines 313. Alternatively, the data storage drives 206 may be coupled to the communication processor node 430 through one or more networks, such as a common bus network.

Additional storage frames 104 may be provided and each is coupled to the adjacent storage frame. Any of the storage frames 104 may comprise communication processor nodes 430, storage bins 200, data storage drives 206, and networks 440.

Further, as described above, the automated data storage library 100 may comprise a plurality of accessors. A second accessor 400, for example, is shown in a right hand service bay 106 of FIG. 4. The second accessor 400 may comprise a gripper 402 for accessing the data storage media, and an XY system 456 for moving the second accessor 400. The second accessor 400 may run on the same horizontal mechanical path as first accessor 208, or on an adjacent path. The exemplary control system additionally comprises an extension network 460 forming a network coupled to network 440 of the storage frame(s) 104 and to the network 440 of left hand service bay 102.

In FIG. 4 and the accompanying description, the first and second accessors are associated with the left hand service bay 102 and the right hand service bay 106 respectively. This is for illustrative purposes and there may not be an actual association. In addition, network 440 may not be associated with the left hand service bay 102 and network 460 may not be associated with the right hand service bay 106. Depending on the design of the library, it may not be necessary to have a left hand service bay 102 and/or a right hand service bay 106.

Figure 5:
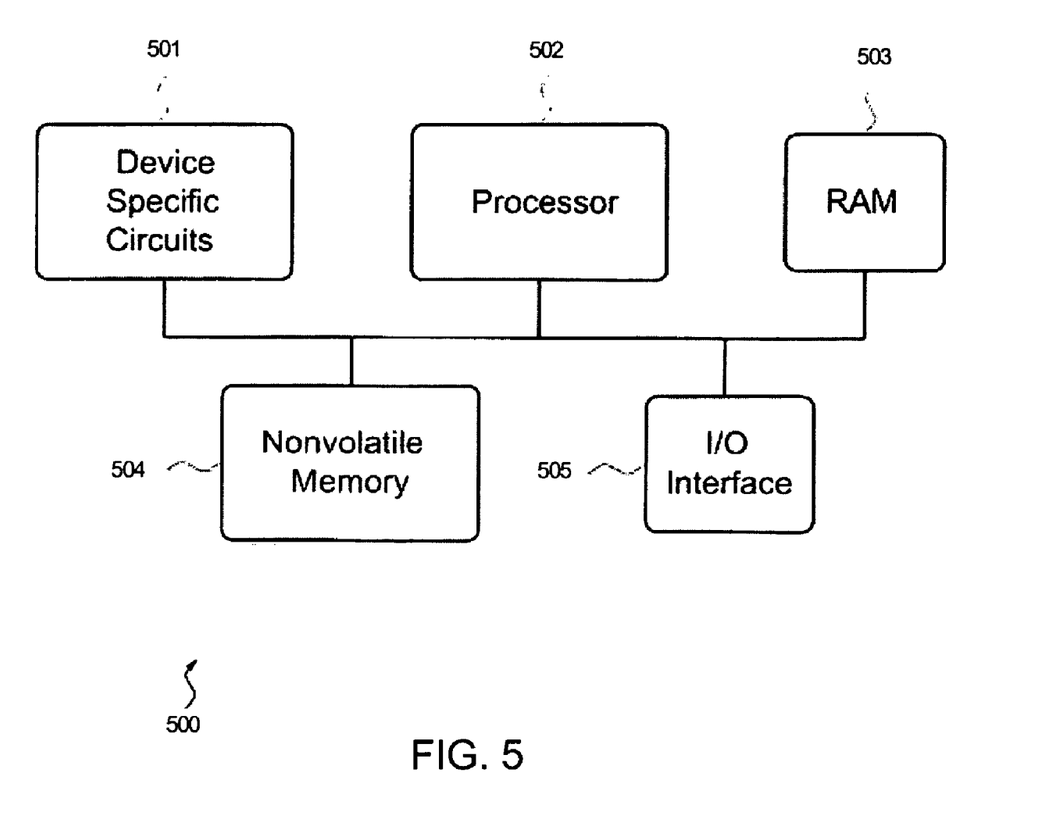
FIG. 5 is a block diagram depicting an exemplary controller configuration for the library of FIG. 1.

An automated data storage library 100 typically comprises one or more controllers, such as library controller 320 (FIG. 3), to direct the operation of the automated data storage library. A data storage drive 206 typically comprises one or more controllers, such as drive controller 302 (FIG. 3). Host computers typically comprise similar controllers. A controller may take many different forms and may comprise, for example but not limited to, an embedded system, a distributed control system, a personal computer, or a workstation, etc. In another example, one of the processor nodes 430, 434, 444, 450, 452, 456 may comprise a controller. Still further, two or more of the processor nodes may comprise a controller. In this example, the controller may be distributed among the two or more processor nodes. Essentially, the term "controller" as used herein is intended in its broadest sense as a device or system that contains at least one processor, as such term is defined herein. FIG. 5 shows a typical controller 500 with a processor 502, RAM (Random Access Memory) 503, non-volatile memory 504, device specific circuits 501, and I/O interface 505. Alternatively, the RAM 503 and/or nonvolatile memory 504 may be contained in the processor 502 as could the device specific circuits 501 and I/O interface 505. The processor 502 may comprise, for example, an off-the-shelf microprocessor, custom processor, FPGA (Field Programmable Gate Array), ASIC (Application Specific Integrated Circuit), discrete logic, or the like. The RAM (Random Access Memory) 503 is typically used to hold variable data, stack data, executable instructions, and the like. The nonvolatile memory 504 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), MRAM (Magnetoresistive Random Access Memory), battery backup RAM, CompactFlash™, Secure Digital Media™, and hard disk drives. The nonvolatile memory 504 is typically used to hold the executable firmware and any nonvolatile data. The I/O interface 505 comprises a communication interface that allows the processor 502 to communicate with devices external to the controller. Examples may comprise, but are not limited to, serial interfaces such as RS-232, USB (Universal Serial Bus), Fibre Channel, SCSI (Small Computer Systems Interface), Ethernet, CAN (Controller Area Network), etc. The device specific circuits 501 provide additional hardware to enable the controller 500 to perform unique functions such as, but not limited to, motor control of a cartridge gripper. The device specific circuits 501 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 501 may reside outside the controller 500.

Figure 6A:
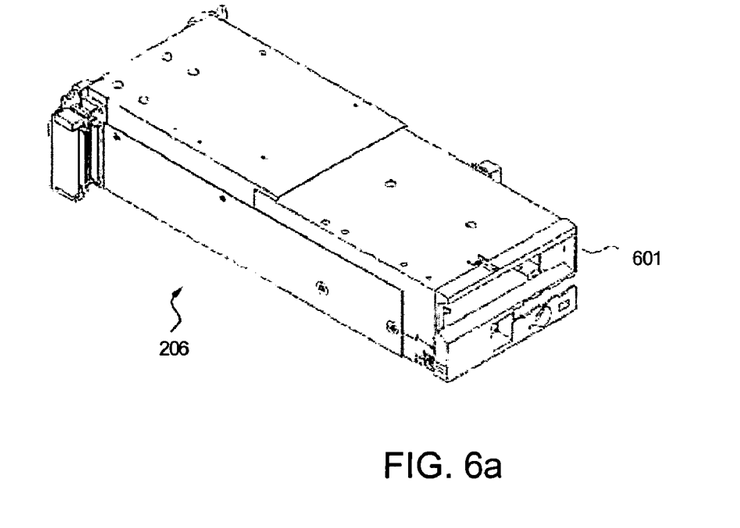
FIGS. 6a, 6b are isometric views of the front and rear, respectively of one example of a data storage drive for the library of FIG. 1.
Figure 6B:
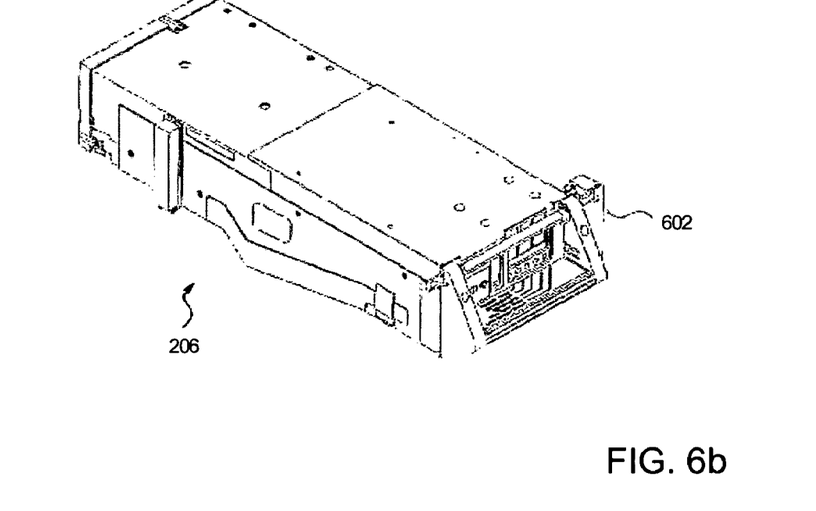

FIGS. 6a and 6b illustrate an embodiment of the front 601 and rear 602 of a data storage drive 206. In the example of FIGS. 6a, 6b, the data storage drive 206 comprises a hot-swap drive canister. This is only an example and is not meant to limit the present description to hot-swap drive canisters. In fact, any configuration of data storage drive may be used whether or not it comprises a hot-swap canister.

Figure 7:
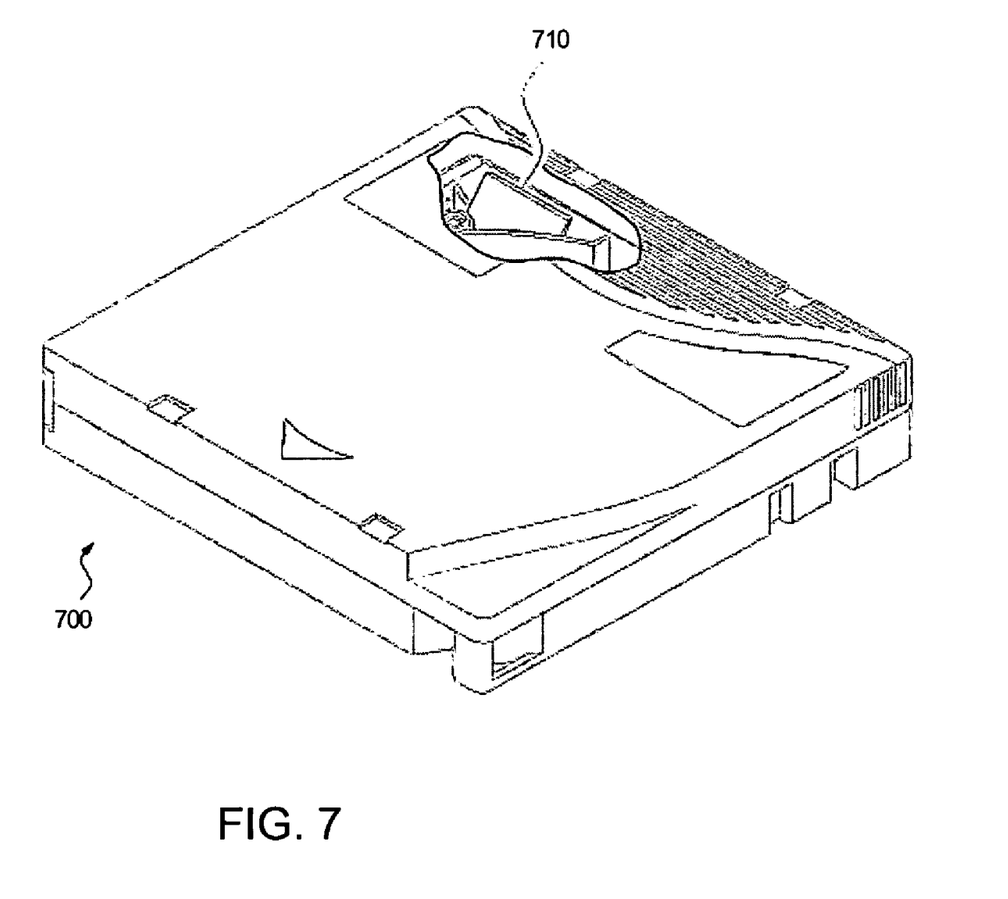
FIG. 7 is an isometric view of one example of a data storage cartridge for the library of FIG. 1.

FIG. 7 illustrates an embodiment of a data storage cartridge 700 with a cartridge memory 710 shown in a cutaway portion of the Figure. This is only an example and is not meant to limit the present description to cartridge memories. In fact, any configuration of data storage cartridge may be used whether or not it comprises a cartridge memory.

While the preferred embodiments of the present description have been illustrated in detail, the skilled artisan will appreciate that modifications and adaptations to those embodiments may be made without departing from the scope of the present description as set forth in the following claims.

What is claimed is:

1. A method, comprising:

carrying drive commands from a host system, through a first, physical, host-drive interface port of a data storage drive, through a host-drive interface path of said data storage drive and to a drive controller of said data storage drive;

responsive to said drive commands from a host system, selectively reading data from and writing data to a media item removably received in said data storage drive, carrying library commands from a host system, through a second, physical, host-library interface port of said data storage drive, through a host-library interface path of said data storage drive and to a controller of said data storage drive wherein said second, host-library interface port is physically separate from said first, host-drive interface port;

relaying said library commands from a controller of said data storage drive to a third, physical, library communication port of said storage drive, said third, library communication port of said storage drive being coupled to an automated data storage library and being physically separate from said first, host-drive interface port and said second, host-library interface port of said storage drive;

wherein the drive commands from a host system are conducted primarily through the first, physical, host-drive interface port and the host-drive interface path to the drive controller of said data storage drive, and the library commands from a host system are conducted primarily through the second, physical, host-library interface port and the host-library interface path to the third, physical library communication port of the data storage drive.

2. The method of claim 1, further comprising identifying the first, physical, host-drive interface port with a first physical device identification number and the second, physical, host-library interface port with a second physical device identification number different from said first physical device identification number.

3. The method of claim 1 wherein said drive controller includes a drive command controller coupled to said first, physical, host-drive interface path and responsive to drive commands from a host system to selectively read data from and write data to a media item removably received in said data storage drive, and a library command controller coupled to said host-library interface path and adapted to relay library commands from said second, physical, host-library interface path to said third, physical, library communication port.

4. The method of claim 1, further comprising configuring the second, physical, host-library interface port as a host-drive interface port; and
 subsequently reconfiguring the second, physical, host-drive interface port back as a host-library interface port.

5. The method of claim 1, further comprising configuring the first, physical, host-drive interface port as a host-library interface port; and
 subsequently reconfiguring the first, physical, host-library interface port back as a host-drive interface port.

6. The method of claim 1, wherein the data storage drive comprises a magnetic tape drive and the media item comprises a magnetic tape cartridge.

7. The method of claim 1, wherein the first, physical, host-drive interface port comprises a small computer systems interface (SCSI) and the second, physical, host-library interface port comprises a small computer systems interface (SCSI).

8. The method of claim 1, wherein the first, physical, host-drive interface port comprises a Fibre Channel interface and the second, physical, host-library interface port comprises a Fibre Channel interface.

9. A data storage drive for use with a portable, removable data storage media item, comprising:
 a drive controller, a first, physical, host-drive interface port adapted to be coupled to a host system, and a host-drive interface path coupling said first, physical, host-drive interface port to said drive controller and adapted to carry drive commands from a host system to said drive controller, said drive controller being responsive to drive commands from a host system to selectively read data from and write data to a portable, removable media item; and
 said data storage drive further comprising a second, physical, host-library interface port adapted to be coupled to a host system, a third, physical, library communication port adapted to be coupled to an automated data storage library, and a host-library interface path coupling said second, physical, host-library interface port to said drive controller and adapted to carry library commands from a host system, said drive controller being adapted to relay library commands from said second, physical, host-library interface path to said third, physical, library communication port,
 wherein the first, physical, host-drive interface port, the second, physical, host-library interface port, and the third, physical, library communication port are each physically separate from each other physical port, and wherein said data storage drive is adapted so that the drive commands from a host system are conducted primarily through the first, physical, host-drive interface port and the host-drive interface path to the drive controller of said data storage drive, and the library commands from a host system are conducted primarily through the second, physical, host-library interface port and the host-library interface path to the third, physical, library communication port of the data storage drive.

10. The data storage drive of claim 9, wherein the second, physical, host-library interface port is configurable to be used as a host-drive interface port, and reconfigurable to be subsequently used back as a host-library interface port.

11. The data storage drive of claim 9, wherein the first, physical, host-drive interface port is configurable to be used as a host-library interface port, and reconfigurable to be subsequently used back as a host-drive interface port.

12. The data storage drive of claim 9, wherein the first, physical, host-drive interface port has a first physical device identification number and the second, physical, host-library interface port has a second physical device identification number different from said first physical device identification number.

13. The data storage drive of claim 9, wherein the data storage drive comprises a magnetic tape drive and the media item comprises a magnetic tape cartridge.

14. The data storage drive of claim 9, wherein the first, physical, host-drive interface port comprises a small computer systems interface (SCSI) and the second, physical, host-library interface port comprises a small computer systems interface (SCSI).

15. The data storage drive of claim 9, wherein the first, physical, host-drive interface port comprises a Fibre Channel interface and the second, physical, host-library interface port comprises a Fibre Channel interface.

16. The data storage drive of claim 9 wherein said drive controller includes a drive command controller coupled to said host-drive interface path and responsive to drive commands from a host system to selectively read data from and write data to a portable, removable media item, and a library command controller coupled to said host-library interface path and adapted to relay library commands from said host-library interface path to said third, physical, library communication port.

17. An automated data storage library for use with a host system for use with a portable data storage media item, and a host system adapted to provide library commands and drive commands, comprising:
 a media storage bin;
 a data storage drive; and
 a library controller responsive to library commands from said host system to transport a media item among media locations including a media storage bin and a data storage drive, wherein
 a data storage drive has a drive controller, a first, physical, host-drive interface port adapted to be coupled to said host system, and a host-drive interface path for drive commands from said host, coupling said first, physical, host-drive interface port to said drive controller, said drive controller being responsive to drive commands from said host system to selectively read data from and/or write data to a media item removably received in said data storage drive, said data storage drive further comprising a second, physical, host-library interface port physically separate from said first, physical, host-drive interface port and adapted to be coupled to said host, a third, physical, library communication port physically separate from said first, physical, host-drive interface port and said second, physical, host-library interface port, and coupled to said drive controller and adapted to be coupled to said library controller and a host-library interface path for library commands from said host, coupling said second, physical, host-library interface port to said drive controller, said drive controller being adapted to relay library commands from said second, physical, host-library interface port to said third, physical, library communication port, wherein the drive controller is adapted so that the drive commands from the host system are conducted primarily through the first, physical, host-drive interface port and the host-drive interface path to the drive controller of said data storage drive, and the library commands from said host system to said library controller are conducted primarily through the second, physical, host-library interface port and the host-library interface path to the third, physical, library communication port of the data storage drive.

18. The automated data storage library of claim 17, wherein the second, physical, host-library interface port is configurable to be used as a host-drive interface port, and reconfigurable to be subsequently used back as a host-library interface port.

19. The automated data storage library of claim 17, wherein the first, physical, host-drive interface port is configurable to be used as a host-library interface port, and reconfigurable to be subsequently used back as a host-drive interface port.

20. The automated data storage library of claim 17, wherein the first, physical, host-drive interface port has a first physical device identification number and the second, physical, host-library interface port has a second physical device identification number different from said first physical device identification number.

21. The automated data storage library of claim 17, wherein the data storage drive comprises a magnetic tape drive and the media item comprises a magnetic tape cartridge.

22. The automated data storage library of claim 17, wherein the first, physical, host-drive interface port comprises a Fibre Channel interface and the second, physical, host-library interface port comprises a Fibre Channel interface.

23. The automated data storage library of claim 17, wherein the first, physical, host-drive interface port comprises a small computer systems interface (SCSI) and the second, physical, host-library interface port comprises a small computer systems interface (SCSI).

* * * * *